Oct. 21, 1930.  J. G. A. STRANDELL  1,779,220
SPLIT CLAMPING RING CONSTRUCTION
Filed March 9, 1929
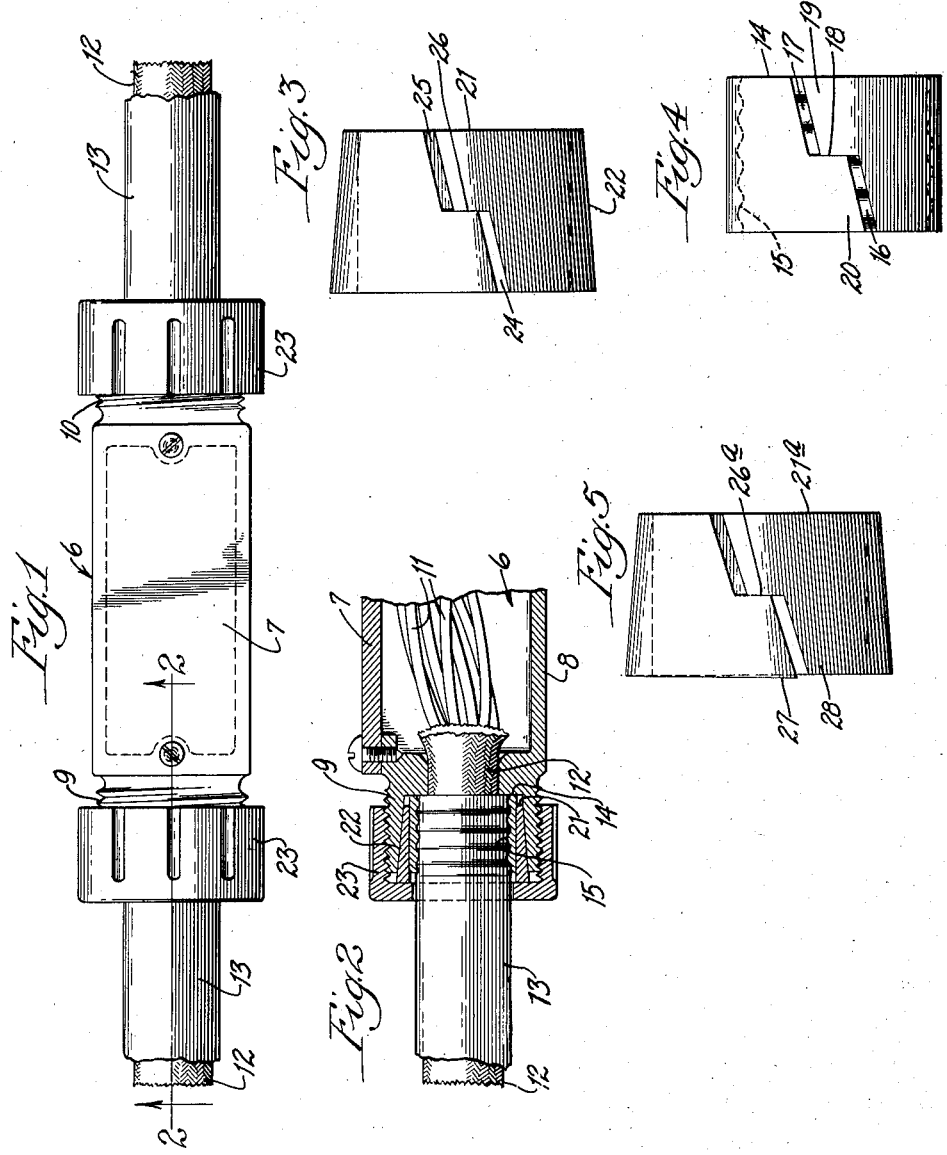
Inventor:
Johannes G. A. Strandell,
By Dyrenforth, Lee, Chritton & Wiles,
Att'ys Patented Oct. 21, 1930

1,779,220

UNITED STATES PATENT OFFICE

JOHANNES G. A. STRANDELL, OF CHICAGO, ILLINOIS

SPLIT-CLAMPING-RING CONSTRUCTION

Application filed March 9, 1929. Serial No. 345,778.

My invention relates more particularly to clamp-ring devices for use in constructions wherein it is desired moisture-tight joints be provided at such devices, as for example and especially in the case of electrical terminal boxes or other electrical fittings where the electric cables, either unsheathed or enclosed in sheathings or conduits, are clamped in place to such boxes or fittings.

My primary object is to provide a simple and inexpensive construction of clamp ring which will form a very effective moisture-tight joint.

Referring to the accompanying drawings, wherein I have shown my invention embodied in an electrical terminal box:

Figure 1 is a view in side elevation of such a box with electric cables connected with the ends thereof.

Figure 2 is a broken section taken at the line 2—2 on Fig. 1 and viewed in the direction of the arrows.

Figure 3 is an enlarged view in side elevation of a clamp ring device constructed in accordance with my invention and forming a part of the structure of Figs. 1 and 2.

Figure 4 is a view in side elevation of another clamp ring constructed in accordance with my invention and also forming a part of the construction shown in Figs. 1 and 2; and Figure 5, a modification of the ring shown in Fig. 3.

The particular construction chosen by me to illustrate my invention is an electrical terminal box represented at 6, this box being shown as in the form of a casting adapted to be closed at its open side 7 by a suitable cover plate 8 and provided, by way of illustration with hollow bosses 9 and 10 at its opposite ends exteriorly threaded as represented and through which bosses the electric wires for connection within the box, extend.

The electric wires, in the form of a cable, entering the left-hand end of the box in Fig. 2, are represented at 11, the insulating material surrounding these wires to produce a unitary cable construction, being represented at 12. The cable thus provided is sheathed with relatively soft or yielding sheathing material, as for example tape, jute, or sheeted cable, or with lead, or other metal armor, this sheathing being represented at 13.

In this case the connection of the sheathed cable with the box inlet, at the boss 9, comprises a cylindrical split clamping ring represented at 14 and containing corrugations 15 about its inner surface for embedment, upon contracting the ring 14, into the sheathing 13. The ring 14 is split lengthwise, but the joint formed thereby instead of being straight is of zigzag form preferably substantially as shown, to present the relatively circumferentially offset portions 16 and 17 and the substantially circumferentially extending portion 18, the opposing edges of the ring at this joint being of such shape, as shown, as to present the mutually lapping portions 19 and 20 which cooperate to form the joint above referred to.

The connection-construction also comprises a tapered split clamping ring represented at 21 and located within the boss 9 and surrounding the ring 14, the inner surface of the ring 21 being substantially cylindrical and its outer surface 22 of tapered form at which portion it bears against the outwardly flaring inner wall 23 of the boss 9 in which both of these rings extend.

Secured upon the outer end of the boss 9 is an apertured compression cap 23 which bears against the outer, larger, end of the ring 21, it being understood that by screwing the cap 23 upon the boss the ring 21 is forced inwardly along the tapered wall 23 of the boss with the result of contracting the ring 21 about the ring 14 which latter, in turn, is contracted closely about the sheathing 13 of the cable.

The ring 21 is split lengthwise as explained of the ring 14, the offset portions of its joint being represented at 24 and 25 and its circumferential intermediate joint portion at 26.

In both constructions of rings 14 and 25 it is desired that the surfaces forming the circumferential portion of the joint, namely, the portion 18 of the ring 14 and the portion 26 of ring 21, be in such close contact as to render the joint moisture-proof regardless of the degree to which the rings are contracted.

It is preferred that in the case of the ring 21 that it be so formed that the force exerted against the larger end thereof by the cap 23, will be more or less localized against such part of this ring that the surface of the joint portion 26 nearest the larger end of the ring will be forced against the surface which it opposes in the forcing of the ring to clamping position and thereby ensure a perfectly tight joint. As an example of a form of construction in which the operation just described is effected, reference is made to Fig. 5 wherein it will be noted that the ring, here represented at $21^a$ with its intermediate joint portion represented at $26^a$, is so shaped as to present the portion 27 which extends outwardly beyond the adjacent portion 28 of the ring thereby ensuring the production of a tight joint at the joint portion $26^a$ when the compression cap 23 is tightened against the larger end of the ring $21^a$. Furthermore, the jutting portion 27 serves in a measure as a nut lock tending to prevent accidental rotation of the cap in a direction to unscrew it from the box.

While it is desirable that the intermediate ring 14 be provided where the element to be clamped is of yieldable material as explained of the sheathing 13, it will be understood that my invention is equally applicable to a construction in which no intermediate clamping ring is employed but a tapered split clamping ring only such as the rings 21 or $21^a$, as for example where the electric wire or cable to be connected with the terminal box is enclosed within a conduit in accordance with common practice, in which case the tapered clamping ring would directly clampingly engage the conduit within the boss on the box.

While I have illustrated and described my invention as embodied in certain forms of structure, I do not wish to be understood as intending to limit it thereto as the same may be variously modified and altered and the invention embodied in other forms without departing from the spirit thereof.

What I claim as new, and desire to secure by Letters Patent, is:

A tapered clamping ring split lengthwise thereof, portions of the opposing edges of the ring at its split portion extending substantially circumferentially of the ring, the portion of the ring at its larger end at one side of the split portion of the ring and which has the one of said opposing edges disposed nearest such larger end, extending outwardly beyond the end portion of the ring at the opposite side of its split portion when said first-referred-to portions are in contact.

JOHANNES G. A. STRANDELL.